(12) United States Patent
Kulesza et al.

(10) Patent No.: US 12,436,960 B1
(45) Date of Patent: Oct. 7, 2025

(54) SYNDICATED SEARCH WITH LARGE LANGUAGE MODELS FOR INTELLIGENT ENTERPRISE ONBOARDING

(71) Applicant: Intuit Inc., Mountain View, CA (US)

(72) Inventors: Steven Kulesza, San Diego, CA (US); Liling Liu, Mountain View, CA (US); Nataly Menares, Mountain View, CA (US); Chase Roossin, San Diego, CA (US); Kai Song Ung, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/195,597

(22) Filed: Apr. 30, 2025

(51) Int. Cl.
*G06F 16/2457* (2019.01)
*G06F 7/14* (2006.01)
*G06F 16/21* (2019.01)
*G06F 16/9532* (2019.01)
*G06F 16/9538* (2019.01)

(52) U.S. Cl.
CPC .......... *G06F 16/24578* (2019.01); *G06F 7/14* (2013.01); *G06F 16/212* (2019.01); *G06F 16/9532* (2019.01); *G06F 16/9538* (2019.01)

(58) Field of Classification Search
CPC .......... G06F 16/24578; G06F 16/9532; G06F 16/212; G06F 16/9538; G06F 7/14
See application file for complete search history.

(56) References Cited

U.S. PATENT DOCUMENTS

2024/0289395 A1\* 8/2024 Zhou ................... G06F 16/9532

\* cited by examiner

*Primary Examiner* — Kannan Shanmugasundaram
(74) *Attorney, Agent, or Firm* — Lathrop GPM LLP

(57) ABSTRACT

A method includes generating, by a large language model (LLM), a multitude of search queries from a user input term obtained from a user application. The method further includes, executing, by the LLM, the multitude of search queries to obtain a multitude of verified search results regarding a multitude of candidates. A multitude of web presence schemas corresponding to the multitude of candidates from the multitude of verified search results is generated. The method further includes web-scraping a multitude of websites of a subset of candidates selected from the multitude of candidates to obtain a set of corresponding web-scraping payloads. The method further includes merging the corresponding web-scraping payloads with corresponding web presence schemas of the subset of candidates to obtain a multitude of updated web presence schemas. The method further includes presenting the multitude of updated web presence schemas of the subset of candidates in the user application.

13 Claims, 6 Drawing Sheets

Example of prompt by structure agent

You are a business information abstraction specialist, given a business name and possibly a business website url, your goal is to find relevant information from the research context provided.

Important Instructions:
- Take your time to search the web. With high confidence, fill out the provided JSON schema.
- Return the provided business for `business_name`.
- For `website_url`:
- If given, return the given URL
- ALWAYS include the full protocol (http:// or https://) in the URL. Don't return any params on the url. Example: https://www.google.com is valid.
- If the protocol is missing, add https:// as the default
- Never return a URL without a protocol
- Never provide another business name or URL.
- If given a generic business name, please find a real business with the same name.
- If you provide a URL you should prioritize using the URL to find the company information. The next credible source would be to search for the company on LinkedIn or business indexes.
- The business you suggest must be based in the United States.
- For `industry_name` and `industry_code` they must correspond to the NAICS mapping: NAICS_Codes

— 502

Example of web presence data model

BUSINESS_SEARCH_SCHEMA = {
"type": "object",
"title": "BusinessSearchSchema",
"properties": {
"business_name": {
"type": "string",
"description": "The name of the business",
"example": "Intuit",
"maxLength": 100,
},
"company_size": {
"type": "string",
"description": "The number of employees in the company. Usually found on LinkedIn or ZoomInfo. You may find that the number of employees found online does not always match the available ranges. In this case, select the company size range that most closely matches the number/numbers found online.",
"enum": enum_to_list(CompanySize),
"nullable": True,
},
"website_url": {
"type": "string",
"description": "The URL of the business website. It must be their main website and must point to the home page. Must start with 'http://' or 'https://'.", "example": "https://www.example.com",
"nullable": True,
},
"business_type": {
"type": "string",
"description": "The type of business legal entity",
"enum": enum_to_list(BusinessType),
},
"industry_name": {
"type": "string",
"description": "The 2022 NAICS industry name. If an explicit value is not found then provide your best guess based on the business activities, description, products, and/or services. Industry name and industry code must match.",
"example": "Financial Transactions Processing, Reserve, and Clearinghouse Activities",
"nullable": True,
}

SYNDICATED SEARCH WITH LARGE LANGUAGE MODELS FOR INTELLIGENT ENTERPRISE ONBOARDING

BACKGROUND

Enterprise software encompasses diverse domains, such as small business financial accounting, healthcare portals, student management platforms of educational institutions, etc. Enterprise software may be required to protect sensitive information, and handle large amounts of data, such as business information, patient information, student information, etc. in accordance with industry-specific regulations and standards for data privacy and security. To this end, enterprise software systems may have onboarding processes. Onboarding refers to gathering of entity information and generation of digital profiles of the entities. The entities may be users, and/or juristic entities. Further, onboarding may entail integrating user and transactional data into the enterprise software, and providing training sessions and learning resources to ensure that users can manage the enterprise software advantageously.

Onboarding processes may be time-consuming and manual. A user may have to spend large amounts of time manually entering data that may have to be retrieved from diverse sources. A manual process for creating a digital profile of an entity may not have automated data checking capabilities. The data from the diverse information sources may be in different formats. Conversion to an acceptable format may result in inconsistencies that may complicate data analysis and reporting. Further, in the absence of automated checking, authentication, and merging techniques, duplicate or false entries may affect the reliability of the software. Additionally, manual digital profile generation may prove increasingly impractical and inefficient as the volume of data grows. Manual digital profile generation may lack integration with other systems, making it difficult to synchronize data across different platforms. Thus, a technical challenge arises in generating a verifiable digital profile of an entity with verifiable data points from authoritative sources by performing a smart search of online sources based on a minimal user input.

SUMMARY

In general, in one aspect, one or more embodiments relate to a method. The method includes generating, by a large language model (LLM), a multitude of search queries from a user input term obtained from a user application. The method further includes, executing, by the LLM, the multitude of search queries to obtain a multitude of verified search results regarding a multitude of candidates. The method further includes generating a multitude of web presence schemas corresponding to the multitude of candidates from the multitude of verified search results. The method further includes web-scraping a multitude of websites of a subset of candidates selected from the multitude of candidates to obtain a set of corresponding web-scraping payloads. The method further includes merging the corresponding web-scraping payloads with corresponding web presence schemas of the subset of candidates to obtain a multitude of updated web presence schemas. The method further includes presenting the multitude of updated web presence schemas of the subset of candidates in the user application.

In general, in one aspect, one or more embodiments relate to a system. The system includes at least one computer processor and an enterprise search service, executing on the at least one computer processor. The system further includes a web understand service, executing on the at least one computer processor. The system further includes a large language model (LLM) executing on the at least one computer processor. The system is configured for generating, by a large language model (LLM), a multitude of search queries from a user input term obtained from a user application. The system is further configured for executing, by the LLM, the multitude of search queries to obtain a multitude of verified search results regarding a multitude of candidates. The system is further configured for generating a multitude of web presence schemas corresponding to the multitude of candidates from the multitude of verified search results. The system is further configured for web-scraping a multitude of websites of a subset of candidates selected from the multitude of candidates to obtain a set of corresponding web-scraping payloads. The system is further configured for merging the corresponding web-scraping payloads with corresponding web presence schemas of the subset of candidates to obtain a multitude of updated web presence schemas. The system is further configured for presenting the multitude of updated web presence schemas of the subset of candidates in the user application.

In general, in one aspect, one or more embodiments relate to a method. The method includes executing, by an LLM, a multitude of search queries to obtain a multitude of verified search results including information regarding a multitude of candidates. The method further includes generating a multitude of web presence schemas corresponding to the multitude of candidates, based a set of highest confidence results selected from the multitude of verified search results. The method further includes initiating a multitude of web-scraping operations for the multitude of candidates, to obtain a multitude of corresponding web-scraping payloads. The method further includes merging the multitude of corresponding web-scraping payloads with respective web presence schemas of the multitude of web presence schemas, corresponding to respective candidates of the multitude of candidates, by, for a first candidate of the multitude of candidates, obtaining a set of attribute values for a first entity attribute of a first web presence schema of the multitude of web presence schemas, corresponding to the first candidate. A first attribute value of the set of attribute values is obtained from a first web-scraping payload of the multitude of corresponding web-scraping payloads corresponding to the first candidate, and the first web-scraping payload has a highest merge priority. A second attribute value of the set of attribute values is obtained from the first web presence schema, and the first web presence schema has a second highest merge priority, less than the highest merge priority. A third attribute value of the set of attribute values is obtained from a highest confidence result of the set of highest confidence results. The highest confidence result corresponds to the first candidate. The highest confidence result has a confidence score that is higher than confidence scores of other highest confidence results corresponding to the first candidate, and the highest confidence result has a third highest merge priority, less than the second highest merge priority. Merging further includes obtaining a first confidence score of the first attribute value, a second confidence score of the second attribute value, and a third confidence score of the third attribute value. Responsive to the first attribute value being a non-null value, and the first confidence score being higher than an attribute confidence threshold of the first entity attribute, merging further includes selecting the first attribute value as a final attribute value for the first entity attribute. Responsive to the first attribute value being a null value, and the second attribute value being a non-null value, and the second confidence score being higher than the attribute confidence threshold of the first entity attribute, merging further includes selecting the second attribute value as the final attribute value for the first entity attribute. Responsive to the second attribute value being a null value and the third attribute value being a non-null value, and the third confidence score being higher than the attribute confidence threshold of the first entity attribute, merging further includes selecting the third attribute value as the final attribute value for the first entity attribute. A corresponding updated multitude of web presence schemas is obtained in this manner.

Other aspects of one or more embodiments will be apparent from the following description and the appended claims.

BRIEF DESCRIPTION OF DRAWINGS

FIG. 5 shows an example of a web presence data model, in accordance with one or more embodiments.

Like elements in the various figures are denoted by like reference numerals for consistency.

DETAILED DESCRIPTION

One or more embodiments are directed to a system that reliably extracts the digital presence of entities based on a minimal user input. The system presents a technical solution to the technical challenge of extracting the digital presence of an entity with verifiable data points from authoritative sources. The system includes an enterprise search service. The enterprise search service leverages real-time web data from authenticated authoritative sources to generate the verifiable digital profiles. The enterprise search service creates the verifiable digital profiles including specific attributes. The specific data to be extracted is defined in a web presence data model. The system may identify relevant data online. The relevant data is verified using a large language model (LLM). The LLM may be prompted via one or more Artificial Intelligence (AI) agents to identify specific on-page entity attributes, such as addresses, contact information, enterprise descriptions, the North American Industry Classification System (NAICS) industry information, and other verifiable data points. The verifiable data points may act as a "digital fingerprint."

The system further includes a web understand service, to extract data from additional online sources obtained from the initial search. The web understand service extracts data from online sources and may use the LLM to cross-validate the extracted data by comparing multiple sources. Thus, the system uses multiple specialized search pathways and integrates the results. Hence, the responses are grounded in extracted verifiable data, reducing reliance on AI inference.

AI agents included in the enterprise search service and the web understand service programmatically invoke the LLM to perform searches, obtain results and corresponding sources, generate responses, and arbitrate between data sources.

Figure 1:
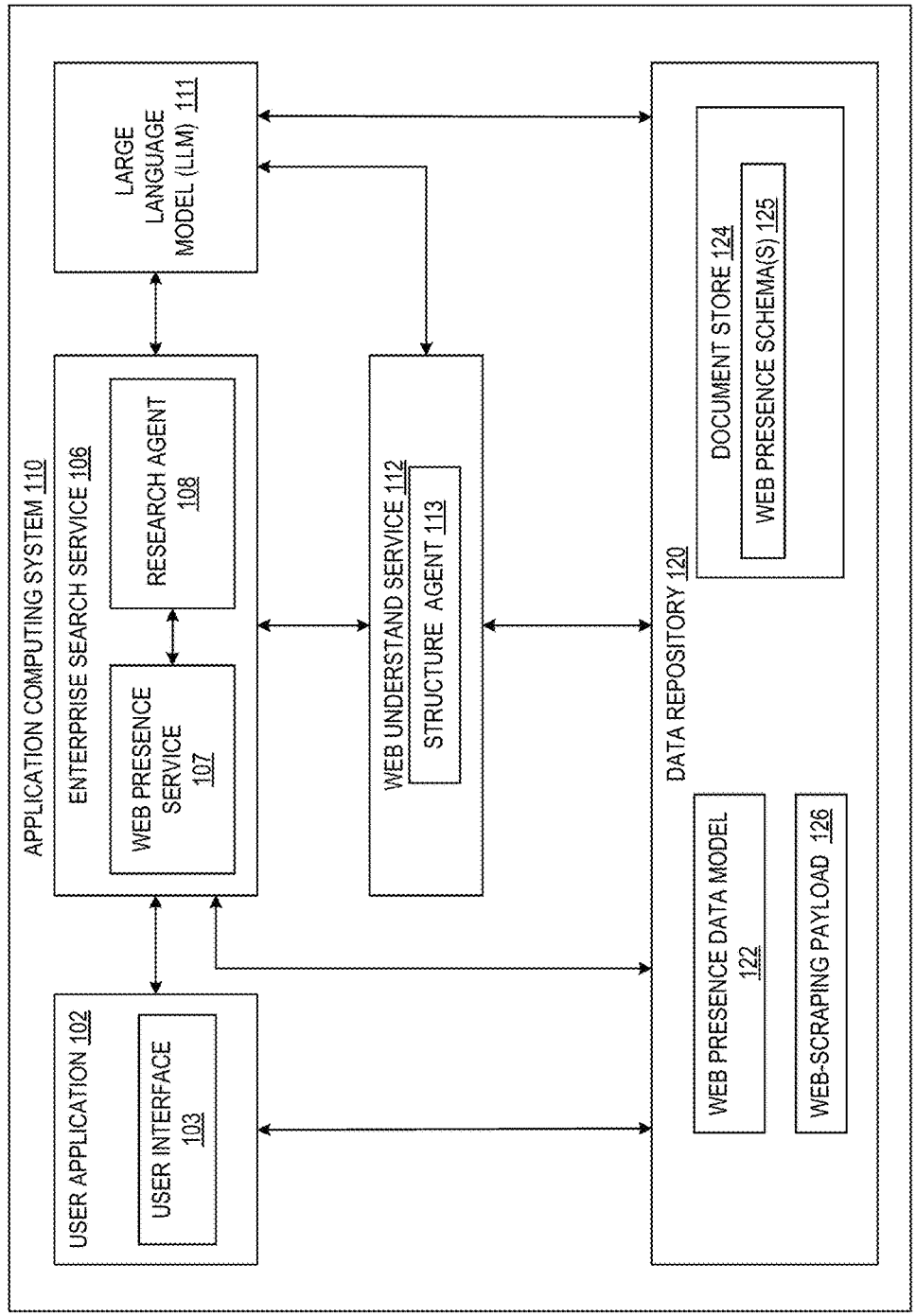
FIG. 1 shows a computing system, in accordance with one or more embodiments.

Attention is now turned to the figures. FIG. 1 shows a computing system (100), in accordance with one or more embodiments. The system shown in FIG. 1 may include an application computing system (110). The application computing system (110) is one or more computer processors, data repositories, communication devices, and supporting hardware and software. The application computing system (110) may be in a distributed computing environment. The application computing system (110) includes a computer processor. The computer processor is one or more hardware or virtual processors which may execute computer readable program code that defines one or more applications. The one or more applications of the system shown in FIG. 1 may include the user application (102), the enterprise search service (106), the large language model LLM (111), and the web understand service (112). An example of the computer processor is described with respect to the computer processor(s) (602) of FIG. 6A. Thus, the application computing system (110) is configured to execute one or more applications, such as the user application (102), the enterprise search service (106), the LLM (111), and the web understand service (112). An example of a computer system and network that may form the application computing system (110) is described with respect to FIG. 6A and FIG. 6B.

The system shown in FIG. 1 includes a data repository (120). The data repository (120) is a type of storage unit or device (e.g., a file system, database, data structure, or any other storage mechanism) for storing data. The data repository (120) may include multiple different, potentially heterogeneous, storage units and/or devices.

The data repository (120) includes a web presence data model (122). The web presence data model (122) is a structured framework that defines how data of the user application (102) is organized and how the relationships among the data are managed. The web presence data model (122) includes entities. Entities may be objects, or information from the real world that have a distinct existence. For example, in a university database, entities may be students, courses, and instructors. In a business registration database, entities may be businesses, business owners, business properties, etc. Entities may have attributes. Attributes are properties or details about the entities. For instance, a student entity might have attributes like student ID, name, and date of birth. Entities may be interconnected by relationships. Relationships describe how entities are related to each other. For example, a student enrolls in a course, or an instructor teaches a course. The relationship between the student and the course is that the student is "enrolled" in the course. The relationship between the teacher and the course is that the teacher "teaches" the course. Thus, the web presence data model (122) is the underlying data model of the user application (102). The data model of the user application (102) describes the logical organization of the data of the user application (102). Examples of web presence data model storage include relational databases, such as MySQL®, NoSQL databases such as MongoDB®, graph databases, such as Neo4j®, etc.

The data repository (120) further includes a document store (124). The document store (124) stores one or more web presence schema(s) (125). The web presence schema (125) includes information about a particular enterprise. The web presence schema (125) is an instantiation of the web presence data model (122) for a particular enterprise. An enterprise may be a business, an educational institution, a government agency, a non-profit organization, or any other juristic enterprise. The web presence schema (125) may include entity attributes and corresponding attribute values. The entity attributes of the web presence schema (125) may correspond to attributes of entities of the web presence data model (122). The attribute values of the web presence schema (125) are attribute values of attributes of entities of the web presence data model (122). For example, the web presence data model (122) may include attributes, such as name, address, etc., for a business owner entity. The web presence schema (125) may include a business owner, Name entity attribute, and a corresponding name attribute value, such as "Business_owner.Name=John Smith." The web presence schema (125) may be a machine-interpretable and understandable document, such as a JavaScript® Object Notation (JSON) document. The document store (124) may be a document database, such as MongoDB®.

The data repository (120) further includes one or more web-scraping payload(s) (126). A web-scraping process is a process for extracting data from a webpage. The extracted data is referred to as raw web-scraped data. Raw web-scraped data from a web-scraping process may be further processed by the LLM to obtain a web-scraping payload (126). The raw web-scraped data may include diverse information, such as text, images, hyperlinks, and other elements present on a webpage. The LLM may process the raw web-scraped data in accordance with a prompt to generate recommendations for changes to a web presence schema. The raw web-scraped data and the recommendations may constitute the web-scraping payload (126). The web-scraping process is described in further detail with reference to the web understand service (112) of FIG. 1. The web-scraping payload(s) (126) may be stored in the data repository (120) as comma separated values (CSV) files, JSON documents, as spreadsheets, DataFrames, text files, etc.

The application computing system (110) further includes a user application (102). The user application (102) is software or application-specific hardware configured for controlling and coordinating one or more specific business processes of a particular domain. The user application (102) may be considered to belong to a software category of enterprise software tools. For example, in a financial domain, the user application (102) may be a financial management and accounting application, e.g., QuickBooks©. In a document management domain, the user application (102) may be a document creation and management application, e.g., Office 365®. In a tax preparation and filing domain, the user application (102) may be a tax preparation and filing application, e.g., Turbo Tax©. In particular, the user application (102) may be configured to include an on-boarding or data intake feature. The on-boarding or data intake feature may include capabilities for a user to enter minimal search input, such as an identifier of an enterprise, and/or a hyperlink to a webpage of the enterprise. Based on the minimal search input, the user application (102) may be configured to display, within the user interface (103) of the user application (102), data obtained from the enterprise search service processing the minimal search input. The data may pertain to the enterprise corresponding to the minimal search input. The data may include attribute fields and values of entities related to the enterprise, in accordance with the web presence data model (122).

The application computing system (110) further includes an enterprise search service (106). The enterprise search service (106) is software or application-specific hardware, which, when executed by the computer processor, controls, and coordinates operation of the web presence service (107) and the research agent (108). The web presence service (107) is software or application-specific hardware, configured to orchestrate the search logic of the enterprise search service (106). Orchestration of the search logic may entail diverse tasks including directing the minimal search input entered by the user to the research agent (108) to perform one or more intelligent web searches. The one or more intelligent web searches may be derivative web searches based on the minimal search input. For example, if the minimal search input is a business, i.e., ABC Heating and Air-Conditioning, the one or more intelligent web searches may include search phrases with keywords, such as "ABC Heating and Air-Conditioning contact information," "ABC Heating and Air-Conditioning address and location," "ABC Heating and Air-Conditioning company type," etc. Further, the web presence service may process the results returned by the research agent (108) to populate fields of a web presence schema with values. The fields of the web presence schema may correspond to entity attributes of the web presence data model. Thus, the web presence service (107) may generate a populated instance of the web presence data model in a web presence schema corresponding to the minimal search input. The web presence service (107) is configured for other features and functionality, described in detail in reference to the method of FIG. 3.

The research agent (108) of the enterprise search service (106) is an artificial intelligence (AI) agent, configured to programmatically invoke the LLM (111) to process one or more prompts of a specific task. AI agents are software entities that perform tasks autonomously using artificial intelligence techniques. AI agents may have the capacity to perceive their environment, make decisions, and take actions to achieve specific goals. AI agents may simulate human-like behavior in various applications, such as virtual assistants, recommendation systems, and autonomous vehicles. More particularly, AI agents of LLMs are designed to understand and generate human-like text. AI agents of LLMs leverage advanced machine learning techniques to process and respond to natural language inputs. The AI agents of LLMs may be configured to perform natural language understanding and generation, autonomy, adaptability, and learning. Autonomy refers to the ability of AI agents of LLMs to operate independently to perform tasks, answer questions, and provide information without human intervention. Adaptability refers to the ability of AI agents of LLMs to personalize interactions with a user, by response adaptation, based on the context of the conversation, and the user's preferences. Finally, learning refers to the ability of AI agents of LLMs to continuously learn from new data and interactions, improving performance and accuracy over time. In one or more embodiments, the research agent (108) may be configured to execute search queries in a parallel manner, utilizing search tools and capabilities supported by the LLM.

The application computing system (110) further includes an LLM (111). An LLM is a type of artificial intelligence model designed to understand and generate human-like text based on vast amounts of data. LLMs are trained on diverse datasets, allowing them to perform a wide range of language-related tasks, such as translation, summarization, and conversation. Examples of LLMs include OpenAI®'s GPT-4® and Google®'s BERT®. Further, LLMs may have capabilities to perform online internet searches for up-to-date content and return search results and corresponding online sources of the search results. Search results that are verifiable and that can be validated by users by looking up the corresponding online source (130) are referred to as verifiable search results. A verifiable search result is a search result that includes the same information as the content of the corresponding online source. That is, the search result and the content of the corresponding online source are semantically similar. More particularly, if a user were to view the content of the corresponding online source, the user may be able to readily conclude that the search result was generated using the corresponding online source as reference material.

For example, a search result may include the information "Retrieval-Augmented Generation (RAG) is a technique that enhances generative AI models by incorporating information from external sources." A corresponding online source for this search result may be "https://en.wikipedia.org/wiki/Retrieval-augmented_generation." Upon navigating to this online source, the user may see content including the sentence "Retrieval-augmented generation (RAG) is a technique that enables generative artificial intelligence (Gen AI) models to retrieve and incorporate new information." Thus, the user may verify that the search results generated by the LLM is consistent with the corresponding online source. In other words, the search result is "verifiable" by the user.

An example of an LLM performing online internet searches, generating answers based on the search results and presenting the answers in conjunction with the corresponding sources of the search results is Google Gemini®. Such LLMs may be referred to as dynamic data-enhanced LLMs. Dynamic data-enhanced LLMs may integrate real-time web search and retrieval augmented generation (RAG) to provide accurate and up-to-date answers to user queries. Another example of a dynamic data-enhanced LLM is WebLlama® from Meta®. Parallel function calling may be supported by the LLM via a parallel execution framework. The parallel execution framework may handle multiple function calls concurrently by using execution threads or asynchronous programming techniques. Further, the LLM may support a search grounding capability, or feature. Search grounding entails an assessment of a search query by the LLM. The LLM may decide whether to perform an online search to obtain real-time information pertaining to the search query, based on the assessment of the search query. In assessing the search query, a prediction score may be assigned for the search query, between 0 and 1. A higher score may indicate a greater need for "grounding" the response to the search query with most up-to-date information obtained from an online search. Thus, the LLM may perform an online search based on the prediction score of the search query.

The application computing system (110) further includes a web understand service (112). In one or more embodiments, the web understand service (112) may be a microservice that is triggered by the web presence service (107). In the context of software architecture, a service refers to a discrete unit of functionality that performs a specific task or set of tasks. Services may be reusable, modular, and may be independently deployed and managed. Further, services may expose their functionality through well-defined interfaces, such as APIs (Application Programming Interfaces), for other interactions from other services or applications. In particular, a microservice may be a specific service designed to be an independently deployable unit within a larger application. Microservices are designed based on the principles of microservice architecture, in which software applications are built as a collection of loosely coupled, fine-grained services. Notably, microservices may communicate via lightweight protocols such as Hypertext transfer protocol (HTTP), Representational State Transfer (REST), etc.

The web understand service (112) is configured to perform web-scraping of data from webpages corresponding to a primary universal resource locator (URL) provided to the web understand service (112) as input. Further, the web understand service (112) may be configured to access and perform web-scraping of any secondary URLs that may be identified in the webpage of the primary URL. In other words, the web understand service (112) is configured to perform recursive web-scraping of data from webpages that correspond to URLs provided as input, or identified in a web-scraping operation.

The web understand service (112) further includes a structure agent (113). The structure agent (113) is an AI agent of the LLM (111). The structure agent (113) is configured to programmatically invoke the LLM (111) with prompts for specific tasks orchestrated by the web understand service (112). In one or more embodiments, the web understand service (112) may programmatically invoke the structure agent (113) to arbitrate between similar attributes with different values and select the appropriate value. The similar attributes with different values may be obtained from web-scraping from diverse webpages. By way of an example, the webpage of an educational institution may include an address of the registrar's office of the educational institution, and a link to the engineering college of the educational institution. The webpage of the engineering college may include several addresses corresponding to diverse engineering departments of the educational institution, e.g., mechanical engineering, materials engineering, computer engineering, electrical engineering, etc. In this case, the web understand service (112) may invoke the structure agent (113) to arbitrate between the different addresses found and obtain an address of the admissions office. The structure agent (113) may programmatically invoke the LLM (111) to process the content of the webpages and return an admissions office address of the educational institution.

While FIG. 1 shows a configuration of components, other configurations may be used without departing from the scope of one or more embodiments. For example, various components may be combined to create a single component. As another example, the functionality performed by a single component may be performed by two or more components.

Figure 2:
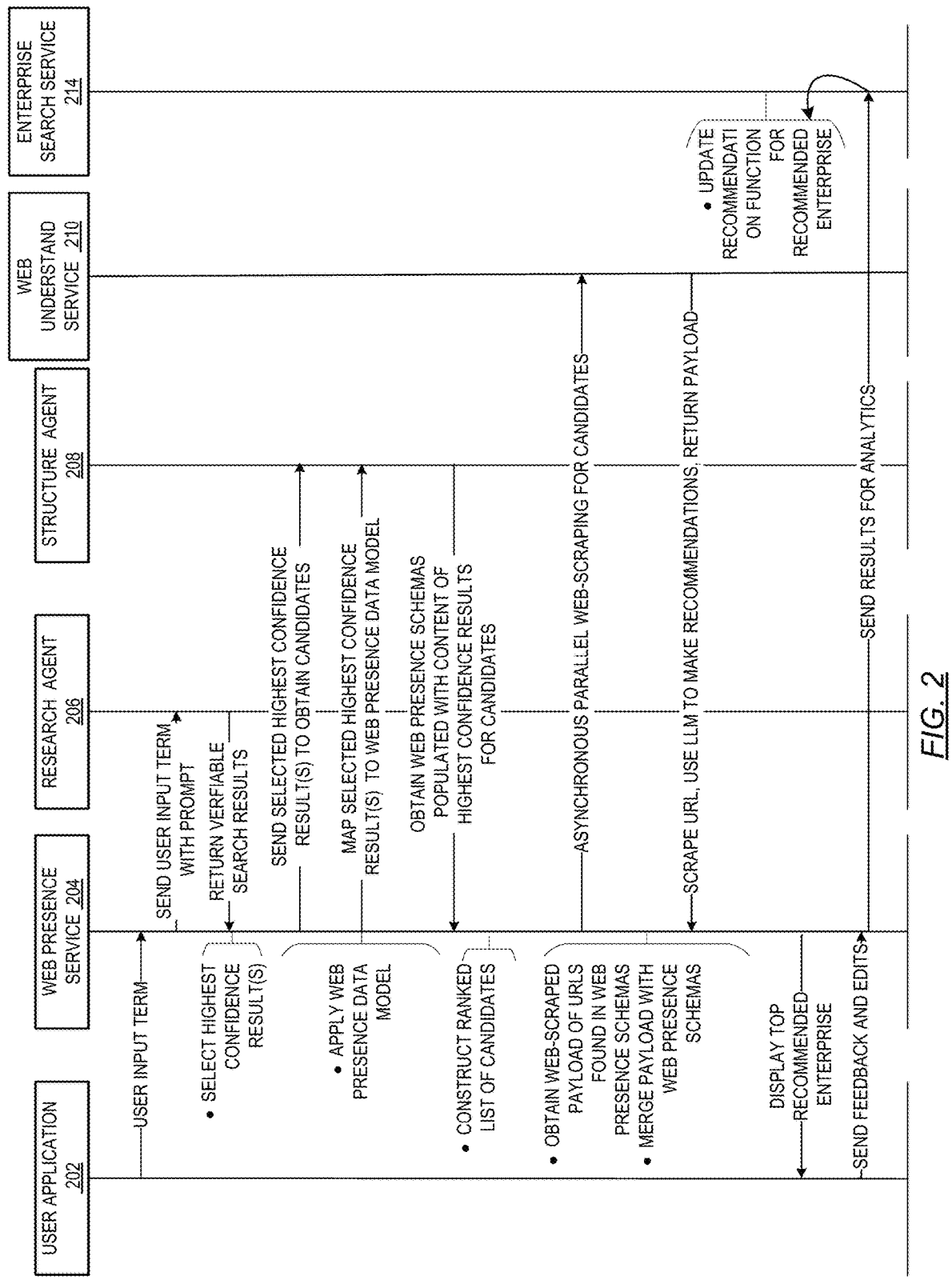
FIG. 2 shows a data flow diagram, in accordance with one or more embodiments.

FIG. 2 shows a data flow diagram of processing a minimal search input from a user from a user application, such as an enterprise name, or URL, to generate a web presence schema. Various components of the data flow diagram of FIG. 2, shown as numbered blocks, may correspond to like-named components shown in FIG. 1. For example, the web presence service (204) of FIG. 2 corresponds to the web presence service (107) of FIG. 1. Similarly, the research agent (206) and the structure agent (208) of FIG. 2 correspond respectively to the research agent (108) and structure agent (113) of FIG. 1.

In FIG. 2, the data flow starts when the web presence service (204) receives an enterprise name and/or URL from the user application (202). The user application (202) corresponds to the user application (102) of FIG. 1. The web presence service (204) may invoke the research agent (206) with the enterprise name/URL as a parameter. The research agent (206) may in turn invoke the LLM to generate a set of search queries incorporating the enterprise name/URL. An example of the prompt generated by the research agent may be found in FIG. 4.

The LLM may perform an online search to obtain search results. The LLM may further obtain the corresponding online sources of the search results. The search results and corresponding online sources obtained by the LLM may be referred to as "verified search results." Additionally, the LLM may obtain corresponding relevance scores for the verified search results. A relevance score is a measure of the relevance of a particular verified search result to the user, based at least on the user context.

The LLM may process the content of the verified search results to generate the response. Notably, when a content "chunk" is retrieved from a verified search result and used as a context in the response generation, it is accompanied by the inline citation to the corresponding online source of the verified search result. The content chunk may be referred to as a "cited context chunk." Thus, the response may include citations to the sources of the information, which are embedded in the content of the response. The citations are available for verification and/or validation of the content of the response by the user.

The research agent (206) may return the verified search results to the web presence service (204). In addition to the verified search results, the research agent (206) may return confidence scores corresponding to the verified search results. The research agent (206) may assign a confidence score to a verified search result based on diverse factors. The web presence service (204) may select verified search results with confidence scores above a confidence score threshold as a set of highest confidence result(s).

The web presence service (204) may further apply the web presence data model to the set of highest confidence result(s). Applying the web presence data model may entail sending the set of highest confidence result(s) to the structure agent (208). Further, the structure agent (208) may programmatically invoke the LLM to identify a set of candidates from the set of highest confidence results. The structure agent (208) may then programmatically invoke the LLM to generate web presence schema instances corresponding to candidates of the set of candidates. The LLM may map the set of highest confidence result(s) to the web presence data model to generate the web presence schema instances. The web presence schema instances may be JSON documents. The JSON documents may be referred to as the web presence schemas. The JSON documents may include entity attributes corresponding to the entities and corresponding attributes of the web presence data model. The JSON documents may further include attribute values corresponding to the entity attributes. The attribute values may be obtained from the highest confidence result(s).

Based on characteristics of the set of web presence schemas, and other factors, the web presence service (204) may rank the set of candidates to obtain a ranked list of candidates.

The set of web presence schemas corresponding to the set of candidates may include one or more URLs obtained from the highest confidence result(s). Accordingly, the web presence service (204) may send the one or more URLs to the web understand service (210) to perform asynchronous parallel web-scraping operations for the set of candidates.

The web understand service (210) may further obtain raw web-scraping data from the websites and/or webpages identified by the set of URLs. For example, and web presence schema may include a URL for the "Red Hat Systems Software" official website. Further, additional URLs may be included for webpages related to "Red Hat Systems Software" from a commercial business information database (e.g., TechCrunch®), and from a government business registration database (e.g., bizfile California), etc. Accordingly, the web understand service (210) may launch asynchronous, parallel web-scraping operations on the websites and/or webpages identified by the aforementioned URLs of the example.

The output of the one or more web-scraping operations may be raw web-scraping data corresponding to each web-scraping operation. Thus, a situation may arise in which similar, but not identical, raw web-scraping data may be obtained from diverse individual websites/webpages. In this situation, the web understand service (210) may prompt the LLM to make recommendations for modifications to the web presence schema. The recommendations may include specific entity attributes and attribute values by arbitrating between the raw web-scraping data from the diverse individual websites/webpages. For example, a company size of an enterprise (e.g., 500+ employees, 100-500 employees, etc.) may be obtained from a commercial business information database, such as TechCrunch®. For the same enterprise, a company size may be obtained from a government agency business registration database of a particular state/province/territory administration (e.g., bizfile California). The LLM may be prompted to preferentially select attribute values from a verifiable and authoritative source, such as a government agency, over commercial sources. Accordingly, the LLM may further select the data obtained from the business registration database of the particular state/province/territory for recommendation.

In this manner, raw web-scraped data obtained from the asynchronous parallel web-scraping operations may be consolidated and/or aggregated into a particular "payload" of web-scraped data for a particular candidate. The web-scraped data payload is returned to the web presence service (204). The web presence service (204) may further merge the particular web-scraping payload with the web presence schema corresponding to the particular candidate. Subsequently, the web presence service (204) may reorder the candidates based on a recommendation function. The recommendation function may analyze the corresponding populated web presence schemas and other factors. The recommendation function is described in detail in reference to FIG. 3.

Of the final ranked list of candidates, the enterprise search service (214) may present the top recommended enterprise in the user application (202). In the user application (202) the user may view the data of the top recommended enterprise and validate the data if found acceptable and accurate. If the user does not find the data accurate, the user may further edit the data to correct inaccuracies and send feedback on the overall accuracy of the retrieved data of the top recommended enterprise. The feedback and edits may further be analyzed to determine corrections to the recommendation algorithm. The recommendation algorithm may be modified based on the corrections, in real-time or asynchronously and periodically.

Figure 3:
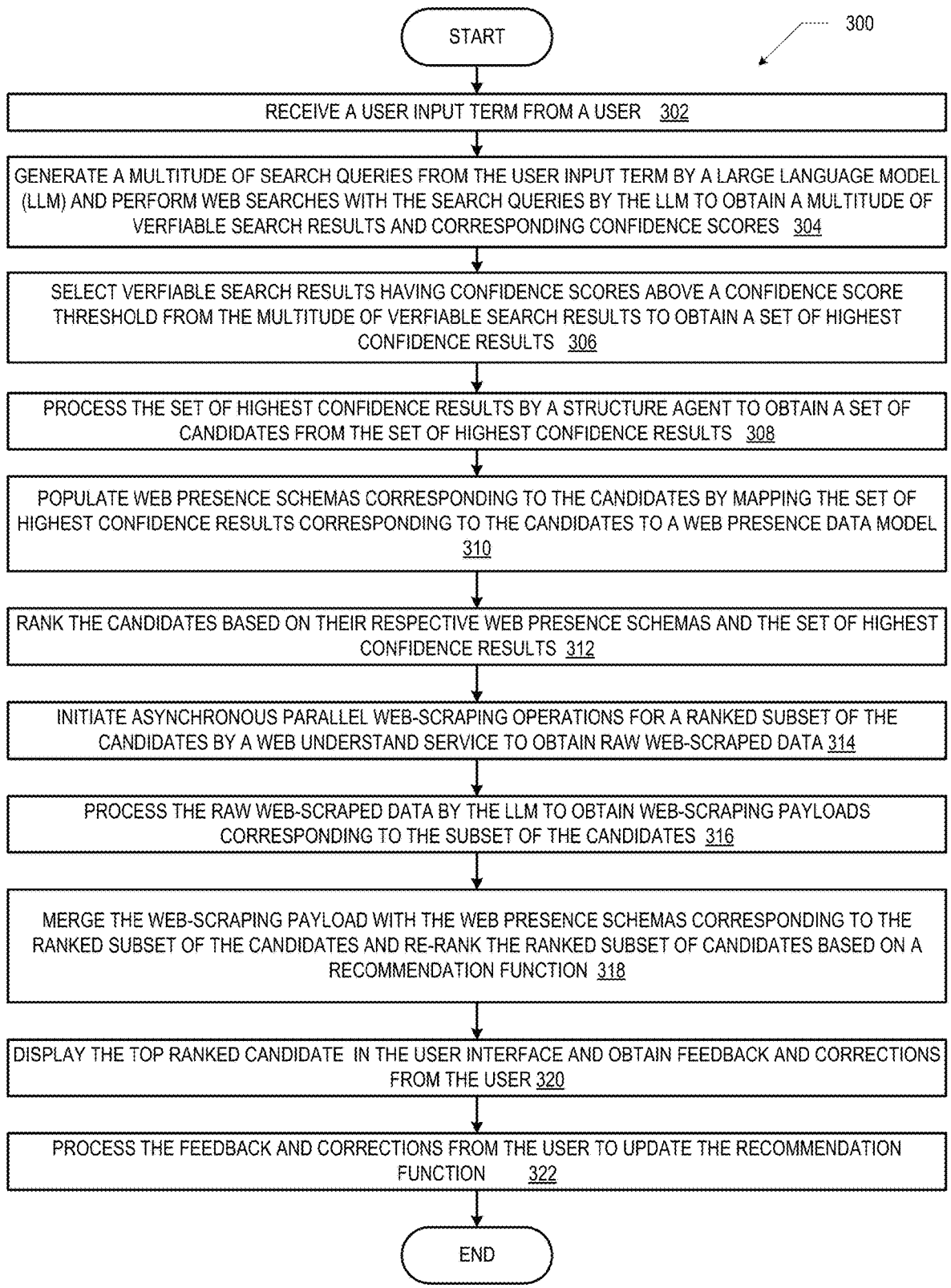
FIG. 3 shows a flowchart of a method, in accordance with one or more embodiments.

FIG. 3 shows a flowchart 300 of a method for extracting a digital presence of an enterprise using real-time web data to establish an accurate digital profile of the enterprise, in accordance with one or more embodiments. The method of FIG. 3 may be implemented using the system of FIG. 1 and one or more of the steps may be performed on or received at one or more computer processors. While the various steps in the flowchart 300 are presented and described sequentially, at least some of the steps may be executed in different orders, may be combined, or omitted, and at least some of the steps may be executed in parallel. Furthermore, the steps may be performed actively or passively.

In Block 302, a search term from a user is received. The search term includes at least an enterprise name. The search term constitutes the minimal search input provided by the user. In one or more embodiments, the search term may include a URL of an enterprise. The search term may be provided by the user via a user interface of a user application. Further, the enterprise search service may receive the search term from the user application.

In Block 304, a multitude of search queries is generated from the search term by the LLM. Further, web searches with the search queries are performed by the LLM to obtain verified search results and corresponding confidence scores. In one or more embodiments, the research agent may programmatically invoke the LLM to generate the multitude of search queries, with a prompt. The prompt may include the user input term as input. The prompt may further include an instruction to generate the multitude of search queries based on the user input term by populating a multitude of search query templates with the user input term. In one or more embodiments, the user input term may be processed by the LLM in accordance with the prompt to generate a multitude of search queries.

For example, the search term may be "XYZ Corporation." The search query templates may include search utterances, such as <search term>"contact information," <search term>"address and location,"<search term>"ownership type,"<search term> "industry type," etc. The search query templates may be supplied as examples in the prompt to the LLM. Accordingly, the LLM may substitute "XYZ Corporation" in place of <search term> in the search query templates to generate multiple search queries, including "XYZ Corporation contact information," "XYZ Corporation address and location, etc.

In one or more embodiments, a multitude of respective web searches corresponding to the multitude of search queries may be performed by the LLM to obtain the multitude of verified search results and the multitude of corresponding confidence scores. Further, the multitude of verified search results may include information regarding a multitude of candidates. The multitude of candidates may potentially satisfy the minimal search input (the search term) provided by the user. Additionally, the LLM may generate corresponding relevance scores for the verified search results.

The research agent may assign a confidence score to a verified search result based on diverse factors. One confidence score factor may be the online source of the verified search result. In one or more embodiments, the research agent may be configured to identify and prioritize verifiable and authoritative online sources among the diverse online sources from which the verified search results are obtained. Thus, the research agent may assign a higher confidence score to a verified search result from an authoritative online source. Another confidence score factor may be the relevance score of the verified search result obtained from the LLM. Thus, the research agent may generate a corresponding confidence score for a particular verified search result, based at least on confidence score factors of the online source of the particular verified search result and the relevance score of the particular verified search result.

In one or more embodiments, a multitude of web presence schemas corresponding to the multitude of candidates may be generated based on a set of highest confidence results selected from the multitude of verified search results. Accordingly, in Block 306, verified search results having confidence scores greater than a confidence score threshold are selected from the multitude of verified search results to obtain a set of highest confidence results. In Block 308, the set of highest confidence results is processed by a structure agent to obtain a set of candidates from the set of highest confidence results. In one or more embodiments, the structure agent may programmatically invoke the LLM with a prompt. The prompt may include the set of highest confidence results as input. The prompt may further include instructions to identify the multitude of candidates from the set of highest confidence results. The multitude of candidates may potentially satisfy the search term entered by the user. The LLM may generate the multitude of candidates from the prompt.

In Block 310, web presence schemas corresponding to the candidates are populated. The set of highest confidence results corresponding to the candidates is mapped to a web presence data model. In one or more embodiments, the structure agent may programmatically invoke the LLM with a prompt. The structure agent may generate the prompt. The prompt may include the set of highest confidence results, a web presence data model, and the multitude of candidates as input. The prompt may include an instruction to generate respective web presence schemas corresponding to respective candidates of the multitude of candidates. The web presence schemas may be generated by mapping the set of highest confidence results to the web presence data model. The prompt may be processed by the LLM. In processing the prompt, the LLM may populate the respective web presence schemas with entity attributes of the web presence data model and corresponding attribute values obtained from the set of highest confidence results. The multitude of web presence schemas may thus be obtained.

Further, a ranked subset of candidates may be selected from the multitude of candidates. Accordingly, in Block 312, the candidates are ranked based on their respective web presence schemas and the set of highest confidence results. In one or more embodiments, a ranked subset of candidates may be selected from the multitude of candidates. Selection of the ranked subset of candidates may be based on the multitude of web presence schemas and the corresponding confidence scores of the set of highest confidence results. The set of highest confidence results may be selected in turn from the multitude of verified search results.

In one or more embodiments, the ranked subset of candidates may be selected based on diverse factors. One factor may be the completeness of a web presence schema of a particular candidate. A completeness score of respective web presence schemas corresponding to respective candidates of the multitude of candidates may be determined. The completeness score may be a measure of completeness of a web presence schema. For example, the LLM may map the set of highest confidence results to the web presence data model for a particular candidate to populate 80% of the entity attributes with attribute values. Thus, the completeness score of the resulting web presence schema of the particular candidate may be 80% complete. As another factor, the confidence scores of the particular highest confidence results used to populate the web presence schema may be considered. The particular highest confidence results may have diverse respective confidence scores. For example, {95%, 85%, 82%} may be the confidence scores of three particular highest confidence results used to populate the web presence schema for a particular candidate. The confidence scores of the three particular highest confidence results may serve as a measure of the accuracy and correctness of the attribute values of the web presence schema. Accordingly, in one or more embodiments, a ranking score of a candidate of the multitude of candidates may be determined. The ranking score may be based at least on the completeness score of a respective web presence schema corresponding to the respective candidate, and the corresponding confidence scores of the set of highest confidence results. The candidates of the multitude of candidates with ranking scores greater than a ranking score threshold may be selected as the ranked subset of candidates.

The web presence schemas of the ranked subset of candidates may include one or more URLs. The URLs may correspond to certain entity attributes. For example, one entity attribute may be "company profile-registered official website." Another entity attribute may be "company profile-government business registration webpage." The URLs present in the web presence schema of a particular candidate may be explored to obtain additional information, or validation of existing information of the particular candidate.

Accordingly, in Block 314, asynchronous parallel web-scraping operations are initiated for the ranked subset of the candidates by the web understand service to obtain raw web-scraped data. In one or more embodiments, respective web-scraping operations may be initiated for respective candidates of the ranked subset of candidates. In one or more embodiments, a webpage corresponding to a first URL may be retrieved by the web understand service. The first URL may be obtained from a respective web presence schema of a respective candidate of the ranked subset of candidates. Further, the web understand service may obtain raw web-scraping data from the webpage by parsing the fields of the webpage.

In Block 316, the raw web-scraped data is processed by the LLM to obtain web-scraping payloads corresponding to the subset of the candidates. In one or more embodiments, raw web-scraped data of a webpage may be obtained from a respective web-scraping operation performed on a respective webpage. In one or more embodiments, the web understand service may invoke the structure agent. The structure agent may generate a prompt to the LLM. The prompt may include the raw web-scraping data from the webpage obtained in Block 314. Further, the prompt may include an instruction to generate recommendations to update attribute values in the corresponding web presence schema of the candidate of the ranked subset of candidates of Block 314. Recommendations may include completing, referring to filling in missing attribute values. Further, the recommendations may include replacing, referring to replacing existing attribute values. Furthermore, the recommendations may include validating. Validation of an attribute value refers to increasing the confidence score of the attribute value, based on the raw web-scraping data. A given attribute value in a web presence schema being the same in the raw web-scraped data may be an indication of the verifiability and validity of the given attribute value.

For example, the web presence schema may include an address attribute value for XYZ Corporation as XYZ Corporation HQ Address: "XYZ Parkway, Redwood Shores, California." The web presence schema may further include a URL: XYZ Corporation Official Website: "https://XYZCorporation.com." The web understand service may perform a web-scraping operation on this URL. From the raw web-scraped data obtained from the webpage corresponding to the URL, the LLM may determine that the headquarters for XYZ Corporation is indeed "XYZ Parkway, Redwood Shores, California." Thus, the LLM may increase the confidence score of the attribute value, on account of the same value appearing in the webpage corresponding to the URL. In a similar manner, further occurrences of the same attribute value appearing in raw web-scraped data from other web-scraping operations may serve to further increase the confidence score of the attribute value. On the other hand, the headquarters address obtained from the official website may not be "XYZ parkway, Redwood shores CA." In this case, a recommendation to replace the address attribute value in the web presence schema with the headquarters address obtained from the official website may be generated by the LLM. The recommendation may be generated on account of the LLM being prompted to preferentially select attribute fields and corresponding attribute values from a verifiable and authenticated website/webpage over non-verifiable websites/webpages. Accordingly, in one or more embodiments, the prompt may be processed by the LLM to obtain the recommendations. Further, the structure agent may return the raw web-scraping data and the recommendations as a first web-scraping payload.

Notably, the steps of Block 314 and Block 316 may be recursively performed. More particularly, in a web-scraping operation of a first URL, if one or more additional URLs in the raw web-scraping data are identified, then additional web-scraping operations may be initiated corresponding to the one or more additional URLs. In one or more embodiments, responsive to obtaining at least a second URL from parsing the fields of the webpage of the first URL, the web understand service may perform an additional web-scraping operation on the at least second URL to obtain additional raw web-scraping data, which may be processed by the LLM to generate additional recommendations. The additional raw web-scraping data and additional recommendations may be returned by the structure agent as an additional web-scraping payload. The additional web-scraping payload may be further appended to the first web-scraping payload.

In Block 318, the web-scraping payload is merged with the web presence schemas corresponding to the subset of the candidates. Further, the ranked subset of candidates is re-ranked based on a recommendation function. One or more embodiments of merging the web-scraping payload with the web presence schemas is described herein.

For a given entity attribute of a web presence schema corresponding to a candidate, a set of attribute values may be obtained. A first attribute value of the set of attribute values may be obtained from the web-scraping payload corresponding to the candidate. A second attribute value of the set of attribute values may be obtained from the web presence schema. A third attribute value of the set of attribute values may be obtained from the set of highest confidence results. More particularly, the third attribute value may be obtained from a highest confidence result corresponding to the particular candidate. Further, the highest confidence result may have a confidence score higher than confidence scores of other highest confidence results corresponding to the particular candidate. Other elements of the set of attribute values may be obtained in a similar manner.

Corresponding confidence scores for the set of attribute values may be determined. In one or more embodiments, the first attribute value may have a first confidence score obtained from assessing the web-scraping payload based on data completeness and quality metrics. Further, the second attribute value may have a second confidence score based on LLM certainty indicators. The third attribute value may have a third confidence score as the confidence score of the highest confidence result from which the third element was obtained.

Further, a determination is made to select an attribute value from the set of attribute values to be assigned to the entity attribute of the web presence schema. In one embodiment, the first, second, and third confidence scores may be compared. The element of the set of attribute values corresponding to the highest of the first, second, and third confidence scores may be selected as a final attribute value for the entity attribute of the web presence schema.

In other embodiments, the attribute value may be selected based on a priority of the source of the attribute value. The selection is further conditional to the confidence score of the attribute value being higher than an attribute confidence threshold for the entity attribute. In one implementation, the web-scraping payload source may have a highest merge priority. The existing web presence schema populated by the LLM may have a second highest merge priority. The second highest merge priority may be less than the highest merge priority. Finally, the highest confidence result which is the source of the third attribute value may have a third highest merge priority. The third highest merge priority may be less than the second highest merge priority.

Thus, if the first attribute value exists (is a non-null value), and the first confidence score is higher than the attribute confidence threshold, the first attribute value is selected as the final attribute value. The selection of the first attribute value is responsive to the first attribute value originating from the web-scraping payload source, which has a highest merge priority, and having a confidence score higher than the attribute confidence threshold.

If, on the other hand, the first attribute value does not exist (is a null value), then if the second attribute value exists (is a non-null value), and the second confidence score is higher than the attribute confidence threshold, then the second attribute value is selected as the final attribute value for the entity attribute of the web presence schema. The selection of the second attribute value is on account of the non-existence of the first attribute value. Further, the selection of the second attribute value is on account of the second confidence score being higher than the attribute confidence threshold. Finally, the selection of the second attribute value is on account of the second attribute value originating from the web presence schema source, which is the second highest merge priority source.

Furthermore, if the second attribute value does not exist (is null), then if the third attribute value exists, and the third confidence score is higher than the attribute confidence threshold, then the third attribute value is selected as the final attribute value for the entity attribute of the web presence schema. The selection of the third attribute value is on account of the non-existence of the second attribute value. Further, the selection of the third attribute value is on account of the third confidence score being higher than the attribute confidence threshold. Finally, the selection of the third attribute value is on account of the third attribute value originating from the highest confidence source, which is the third highest merge priority source.

Other entity attributes of the web presence schema may be updated in a similar manner. Thus, in the manner described herein, the web presence schemas corresponding to the ranked subset of candidates may be further updated to obtain a corresponding updated subset of web presence schemas.

Subsequently, the ranked subset of candidates may be re-ranked based on a recommendation function. In one or more embodiments, in the recommendation function, diverse scores are determined and combined to re-rank the ranked subset of candidates.

A completeness score of the web presence schema may be determined. The completeness score may be based on the number of non-null entity attributes in the web presence schema.

A consistency score for each entity attribute in the web presence schema may be determined. The consistency score may be based on the number of data sources that have the same attribute value for a particular entity attribute.

Further, an average confidence score for the web presence schema may be calculated as the mean of the confidence scores of the entity attribute values of the web presence schema.

Additionally, a relevance score may be calculated based on a semantic similarity between the LLM-generated search queries and the entity attributes and attribute values of the web presence schema.

The final score of the web presence schema may be calculated as a weighted combination of the completeness score, consistency score, average confidence score, and relevance score. The ranked subset of candidates is re-ordered based on final scores of the corresponding web presence schemas.

In Block 320, the top-ranked candidate of the ranked subset of candidates is displayed in the user interface, and feedback and corrections are obtained from the user. The top-ranked candidate may be a candidate of the ranked subset of candidates having a highest final score. In one or more embodiments, at least a top-ranked candidate from the ranked subset of candidates, and entity attributes and corresponding attribute values of a corresponding updated web presence schema from the updated subset of web presence schemas are presented in the user interface of the user application. Further, at least one user correction of the entity attributes and corresponding attribute values of the corresponding updated web presence schema may be obtained. In one or more embodiments, the user may be presented with diverse options in the user application via the user interface. One option may be to "Approve," namely, accept the top-ranked candidate and related information as the answer to the user-entered search term. Another option may be to "Deny," namely, reject the recommendation and potentially select from other candidates in the list or initiate a new search. Yet another option may be to "Edit," namely, modify the pre-filled information based on their own knowledge or further research. The user feedback and comments may be fed back to the recommendation function to enhance future search results.

Accordingly, in Block 322, the feedback and corrections from the user are processed to update the recommendation function. In one or more embodiments, the enterprise search service may obtain metrics related to the entity attributes and attribute values. For example, the number of correct entity attributes and attribute values may be obtained. Additionally, the number of incorrect entity attributes and attribute values may be obtained. Another metric may be the number of incorrect entity attributes and attribute values that are manually corrected by the user. The count of "true positives," namely the entity attributes with correct attribute values may be determined. Further, a count of "false positives," namely, entity attributes with incorrect attribute values may be determined. Additionally, a count of "false negatives," namely, entity attributes that do not have attribute values may be determined. Based on the true positives, false positives and false negatives, a precision value and a recall value may be determined. Further, an F1 score may be obtained from the precision value and recall value. The F1 score may be used in analyzing the performance of the overall workflow.

Figure 4:
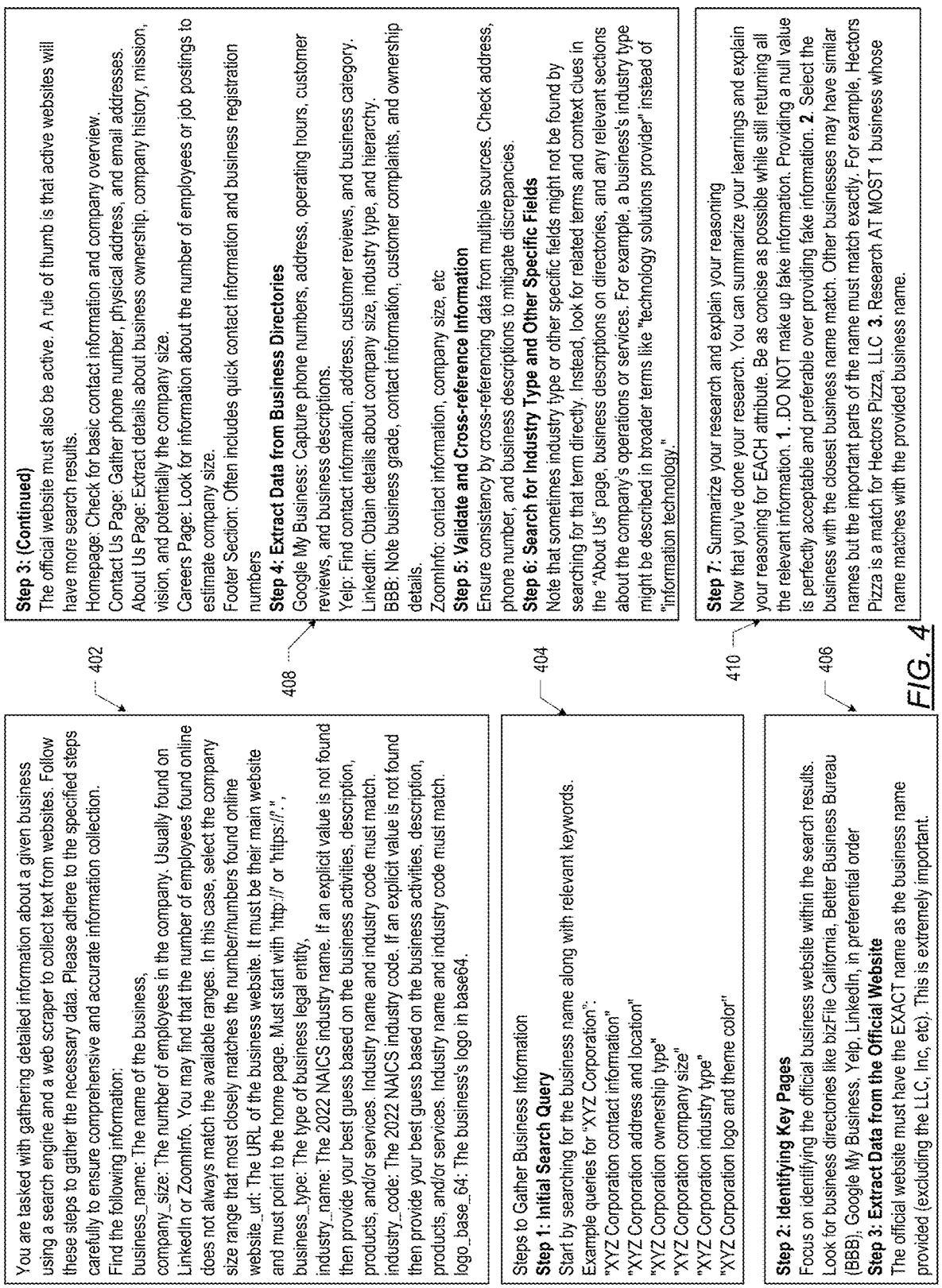
FIG. 4 shows an example of a prompt generated by a system component, in accordance with one or more embodiments.

FIG. 4 shows an example of a detailed prompt generated by the research agent, in accordance with one or more embodiments. The following example is for explanatory purposes only and not intended to limit the scope of one or more embodiments.

Block 402 shows an exemplary section of the prompt generated by the research agent, including overarching general instructions for an enterprise search that is a business. The specific entity attributes, for example, "business_name," "company_size," etc. are exemplary entity attributes of the web presence data model. Block 404 shows an example of search query templates that may be used by the LLM to generate the multitude of search queries incorporating the search term entered by the user. In Block 406, Step 2 of the prompt, namely "Identifying Key Pages," gives a preferential order of sources from which to obtain the information requested. Further, Step 3 clarifies that the business name on the website must have the exact match. In Block 408, the prompt continues to specify attribute values to be obtained from diverse webpages of the official website. Step 4 specifies other external sources of information, such as business directories. Step 5 and Step 6 provide details of cross-referencing and indirect information interpretation. In Block 410, the instructions for generating the response are provided, specifying that the LLM preferentially select a top candidate business for generating the response.

FIG. 5 shows examples of a prompt generated by the structure agent, and a web presence data model, in accordance with one or more embodiments. The following example is for explanatory purposes only and not intended to limit the scope of one or more embodiments.

Block 502 shows an example of a prompt generated by the structure agent for the LLM. The prompt specifies the schema to be filled by the LLM, and the guardrails of obtaining the information. An example schema is shown in Block 504. Block 504 includes JSON fields and sub-fields, to be filled out by the LLM. Schemas for other types of enterprises may be possible.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 6A:
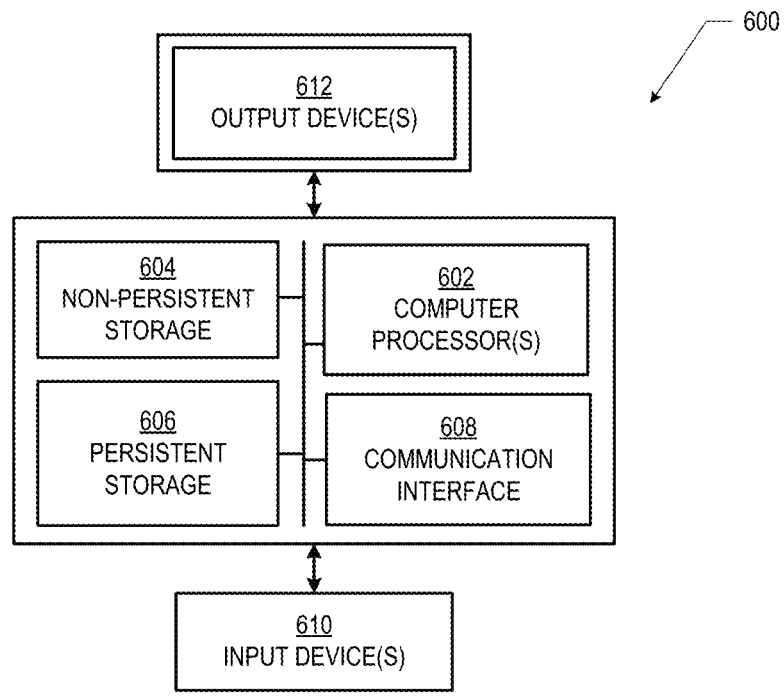
FIG. 6A and FIG. 6B show a computing system, in accordance with one or more embodiments.

For example, as shown in FIG. 6A, the computing system (600) may include one or more computer processor(s) (602), non-persistent storage device(s) (604), persistent storage device(s) (606), a communication interface (608) (e.g., Bluetooth interface, infrared interface, network interface, optical interface, etc.), and numerous other elements and functionalities that implement the features and elements of the disclosure. The computer processor(s) (602) may be an integrated circuit for processing instructions. The computer processor(s) (602) may be one or more cores, or microcores, of a processor. The computer processor(s) (602) includes one or more processors. The computer processor(s) (602) may include a central processing unit (CPU), a graphics processing unit (GPU), a tensor processing unit (TPU), combinations thereof, etc.

The input device(s) (610) may include a touchscreen, keyboard, mouse, microphone, touchpad, electronic pen, or any other type of input device. The input device(s) (610) may receive inputs from a user that are responsive to data and messages presented by the output device(s) (612). The inputs may include text input, audio input, video input, etc., which may be processed and transmitted by the computing system (600) in accordance with one or more embodiments. The communication interface (608) may include an integrated circuit for connecting the computing system (600) to a network (not shown) (e.g., a local area network (LAN), a wide area network (WAN), such as the Internet, mobile network, or any other type of network) or to another device, such as another computing device, and combinations thereof.

Further, the output device(s) (612) may include a display device, a printer, external storage, or any other output device. One or more of the output device(s) (612) may be the same or different from the input device(s) (610). The input device(s) (610) and output device(s) (612) may be locally or remotely connected to the computer processor(s) (602). Many different types of computing systems exist, and the aforementioned input device(s) (610) and output device(s) (612) may take other forms. The output device(s) (612) may display data and messages that are transmitted and received by the computing system (600). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium, such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (602), is configured to perform one or more embodiments, which may include transmitting, receiving, presenting, and displaying data and messages described in the other figures of the disclosure.

Figure 6B:
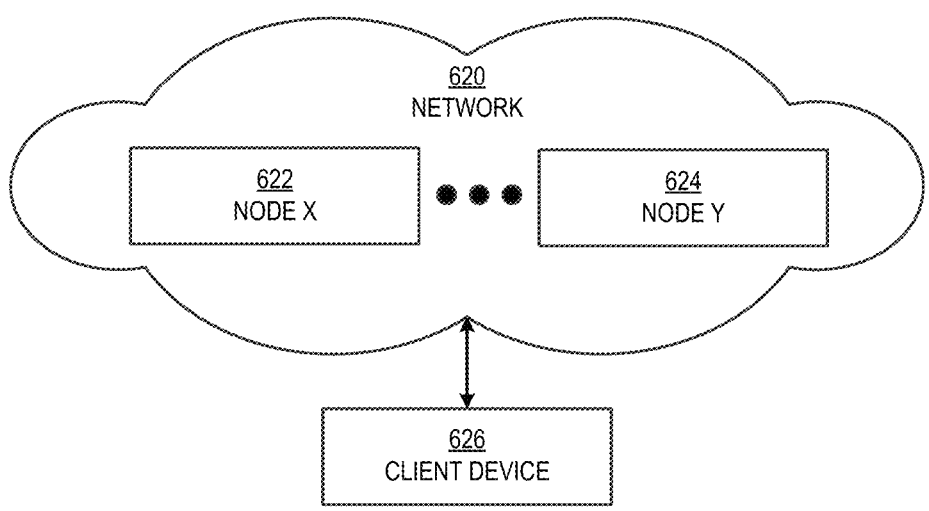

The computing system (600) in FIG. 6A may be connected to, or be a part of, a network. For example, as shown in FIG. 6B, the network (620) may include multiple nodes (e.g., node X (622) and node Y (624), as well as extant intervening nodes between node X (622) and node Y (624)). Each node may correspond to a computing system, such as the computing system shown in FIG. 6A, or a group of nodes combined may correspond to the computing system shown in FIG. 6A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (600) may be located at a remote location and connected to the other elements over a network.

The nodes (e.g., node X (622) and node Y (624)) in the network (620) may be configured to provide services for a client device (626). The services may include receiving requests and transmitting responses to the client device (626). For example, the nodes may be part of a cloud computing system. The client device (626) may be a computing system, such as the computing system shown in FIG. 6A. Further, the client device (626) may include or perform all or a portion of one or more embodiments.

The computing system of FIG. 6A may include functionality to present data (including raw data, processed data, and combinations thereof), such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method, comprising:
    generating, by a large language model (LLM), a plurality of search queries from a user input term obtained from a user application;
    executing, by the LLM, the plurality of search queries to obtain a plurality of verified search results regarding a plurality of candidates;
    generating a plurality of web presence schemas corresponding to the plurality of candidates from the plurality of verified search results;
    web-scraping a plurality of websites of a subset of candidates selected from the plurality of candidates to obtain a set of corresponding web-scraping payloads, wherein the web-scraping is a recursive operation;
    merging the corresponding web-scraping payloads with respective web presence schemas corresponding to respective candidates of the subset of candidates to obtain a plurality of updated web presence schemas, wherein merging comprises:
        for a first candidate of the subset of candidates:
            obtaining a set of attribute values for a first entity attribute of a first web presence schema corresponding to the candidate, wherein:
                a first attribute value of the set of attribute values is obtained from a first web-scraping payload of the corresponding web-scraping payloads corresponding to the first candidate, and the first web-scraping payload has a highest merge priority,
                a second attribute value of the set of attribute values is obtained from the first web presence schema, and the first web presence schema has a second highest merge priority, less than the highest merge priority, and
                a third attribute value of the set of attribute values is obtained from a highest confidence result of the set of highest confidence results,
                    wherein the highest confidence result corresponds to the first candidate, the highest confidence result has a confidence score that is higher than confidence scores of other highest confidence results corresponding to the first candidate, and the highest confidence result has a third highest merge priority, less than the second highest merge priority,
            obtaining a first confidence score of the first attribute value, a second confidence score of the second attribute value, and a third confidence score of the third attribute value,
            responsive to the first attribute value being a non-null value, and the first confidence score being higher than an attribute confidence threshold of the first entity attribute, selecting the first attribute value as a final attribute value for the first entity attribute,
            responsive to the first attribute value being a null value, and the second attribute value being a non-null value, and the second confidence score being higher than the attribute confidence threshold of the first entity attribute, selecting the second attribute value as the final attribute value for the first entity attribute, and
            responsive to the second attribute value being a null value and the third attribute value being a non-null value, and the third confidence score being higher than the attribute confidence threshold of the first entity attribute, selecting the third attribute value as the final attribute value for the first entity attribute; and
    presenting the plurality of updated web presence schemas of the subset of candidates in the user application.

2. The method of claim 1, further comprising:
    executing, by the LLM, the plurality of search queries to obtain the plurality of verified search results regarding the plurality of candidates and corresponding confidence scores of the verified search results;

generating the plurality of web presence schemas corresponding to the plurality of candidates based a set of highest confidence results selected from the plurality of verified search results;

selecting a ranked subset of candidates from the plurality of candidates based on the plurality of web presence schemas and the corresponding confidence scores of the set of highest confidence results as the subset of candidates;

presenting at least a top-ranked candidate from the subset of candidates, and entity attributes and corresponding attribute values of a corresponding updated web presence schema from the corresponding updated web presence schemas in a user interface of the user application;

obtaining at least one user correction of the entity attributes and corresponding attribute values of the corresponding updated web presence schema; and updating a recommendation function based on the at least one user correction.

3. The method of claim 2, wherein selecting the ranked subset of candidates further comprises:

determining a completeness score of respective web presence schemas corresponding to respective candidates of the plurality of candidates;

determining a ranking score of a candidate of the plurality of candidates based at least on the completeness score of a respective web presence schema corresponding to the candidate, and the corresponding confidence scores of the set of highest confidence results; and selecting candidates of the plurality of candidates with ranking scores greater than a ranking score threshold as the ranked subset of candidates.

4. The method of claim 1, further comprising:

obtaining the plurality of search queries by processing the user input term by:

generating a prompt to the LLM including the user input term as input, and an instruction to generate the plurality of search queries based on the user input term by populating a plurality of search query templates with the user input term; and processing the prompt by the LLM to obtain the plurality of search queries.

5. The method of claim 1, wherein generating the plurality of web presence schemas further comprises:

selecting at least one verified search result from the plurality of verified search results having a corresponding confidence score greater than a confidence score threshold, to obtain the set of highest confidence results, generating a first prompt to the LLM including the set of highest confidence results as a first input, and a first instruction to identify the plurality of candidates from the set of highest confidence results, processing the first prompt by the LLM to generate the plurality of candidates, generating a second prompt to the LLM including the set of highest confidence results, a web presence data model, and the plurality of candidates as second inputs, and a second instruction to generate respective web presence schemas corresponding to respective candidates of the plurality of candidates by mapping the set of highest confidence results to the web presence data model, and processing the second prompt by the LLM by:

populating, by the LLM, a respective web presence schema corresponding to a respective candidate of the plurality of candidates with entity attributes of the web presence data model and corresponding attribute values obtained from the set of highest confidence results, to obtain the plurality of web presence schemas, wherein the corresponding attribute values obtained from the set of highest confidence results correspond to the respective candidate.

6. The method of claim 1, wherein performing a web-scraping operation of the respective web-scraping operations further comprises:

retrieving a webpage corresponding to a first universal resource locator (URL) corresponding to a candidate of the subset of candidates;

obtaining web-scraping data from the webpage by parsing a plurality of fields of the webpage;

generating a prompt to the LLM with the web-scraping data as input, and an instruction to generate recommendations to update a corresponding web presence schema of the candidate of the subset of candidates;

processing the prompt by the LLM to obtain the recommendations; and returning the web-scraping data and the recommendations as a first web-scraping payload.

7. The method of claim 6, further comprising:

responsive to obtaining at least a second URL from parsing the plurality of fields of the webpage, performing an additional web-scraping operation on the at least second URL to obtain an additional web-scraping payload, and appending the additional web-scraping payload to the first web-scraping payload.

8. The method of claim 1, further comprising:

prior to presenting the subset of candidates, re-ordering the subset of candidates based on a recommendation function by performing operations comprising:

for a first candidate of the subset of candidates, obtaining a completeness score of a first updated web presence schema of the plurality of updated web presence schemas, corresponding to the first candidate, obtaining a consistency score of at least a first entity attribute of the first updated web presence schema, obtaining an average confidence score of the first updated web presence schema as a mean of confidence scores corresponding to the at least first entity attribute and corresponding attribute value of the first updated web presence schema, obtaining a relevance score based on a semantic similarity of the plurality of search queries and the at least first entity attribute and the corresponding attribute value of the first updated web presence schema, and calculating a final score of the first updated web presence schema as a weighted combination of the completeness score, the consistency score, the average confidence score, and the relevance score, and re-ordering the subset of candidates based on final scores corresponding to the plurality of updated web presence schemas.

9. A system comprising:

at least one computer processor;

an enterprise search service, executing on the at least one computer processor;

a web understand service, executing on the at least one computer processor;

an LLM, executing on the at least one computer processor, and configured for:
generating a plurality of search queries from a user input term obtained from a user application, and
executing the plurality of search queries to obtain a plurality of verified search results regarding a plurality of candidates;
generating a plurality of web presence schemas corresponding to the plurality of candidates from the plurality of verified search results;
web-scraping a plurality of websites of a subset of candidates selected from the plurality of candidates to obtain a set of corresponding web-scraping payloads, wherein the web-scraping is a recursive operation;
merging, by a web presence service of the enterprise search service, the corresponding web-scraping payloads with respective web presence schemas corresponding to respective candidates of the subset of candidates to obtain a plurality of updated web presence schemas, wherein merging comprises:
for a first candidate of the subset of candidates,
obtaining a set of attribute values for a first entity attribute of a first web presence schema corresponding to the candidate, wherein:
a first attribute value of the set of attribute values is obtained from a first web-scraping payload of the corresponding web-scraping payloads corresponding to the first candidate, and the first web-scraping payload has a highest merge priority,
a second attribute value of the set of attribute values is obtained from the first web presence schema, and the first web presence schema has a second highest merge priority, less than the highest merge priority, and
a third attribute value of the set of attribute values is obtained from a highest confidence result of the set of highest confidence results, wherein the highest confidence result corresponds to the first candidate, and wherein the highest confidence result has a confidence score that is higher than confidence scores of other highest confidence results corresponding to the first candidate, and the highest confidence result has a third highest merge priority, less than the second highest merge priority,
obtaining a first confidence score of the first attribute value, a second confidence score of the second attribute value, and a third confidence score of the third attribute value,
responsive to the first attribute value being a non-null value, and the first confidence score being higher than an attribute confidence threshold of the first entity attribute, selecting the first attribute value as a final attribute value for the first entity attribute,
responsive to the first attribute value being a null value, and the second attribute value being a non-null value, and the second confidence score being higher than the attribute confidence threshold of the first entity attribute, selecting the second attribute value as the final attribute value for the first entity attribute, and
responsive to the second attribute value being a null value and the third attribute value being a non-null value, and the third confidence score being higher than the attribute confidence threshold of the first entity attribute, selecting the third attribute value as the final attribute value for the first entity attribute; and
presenting the plurality of updated web presence schemas of the subset of candidates in the user application.

10. The system of claim 9, further configured for:
executing, by the LLM, the plurality of search queries to obtain the plurality of verified search results regarding the plurality of candidates and corresponding confidence scores of the verified search results;
generating the plurality of web presence schemas corresponding to the plurality of candidates based a set of highest confidence results selected from the plurality of verified search results;
selecting a ranked subset of candidates from the plurality of candidates based on the plurality of web presence schemas and the corresponding confidence scores of the set of highest confidence results as the subset of candidates;
presenting at least a top-ranked candidate from the subset of candidates, and entity attributes and corresponding attribute values of a corresponding updated web presence schema from the corresponding updated web presence schemas in a user interface of a user application;
obtaining at least one user correction of the entity attributes and corresponding attribute values of the corresponding updated web presence schema; and
updating a recommendation function based on the at least one user correction.

11. The system of claim 9, further configured for:
generating the plurality of web presence schemas by:
selecting, by a web presence service of the enterprise search service, at least a verified search result from the plurality of verified search results having a corresponding confidence score greater than a confidence score threshold, to obtain the set of highest confidence results,
generating, by a structure agent of the web understand service, a first prompt to the LLM including the set of highest confidence results as a first input, and a first instruction to identify the plurality of candidates from the set of highest confidence results,
processing the first prompt by the LLM to generate the plurality of candidates,
generating, by the structure agent, a second prompt to the LLM including the set of highest confidence results, a web presence data model, and the plurality of candidates as second inputs, and a second instruction to generate respective web presence schemas corresponding to respective candidates of the plurality of candidates by mapping the set of highest confidence results to the web presence data model, and
processing the second prompt by the LLM by:
populating, by the LLM, a respective web presence schema corresponding to a respective candidate of the plurality of candidates with entity attributes of the web presence data model and corresponding attribute values obtained from the set of highest confidence results, to obtain the plurality of web presence schemas, wherein the corresponding attribute values obtained from the set of highest confidence results correspond to the respective candidate.

12. The system of claim 9, further configured for:
re-ordering, by a web presence service of the enterprise search service the subset of candidates based on a recommendation function by performing operations comprising:
for a first candidate of the subset of candidates,
obtaining a completeness score of a first updated web presence schema of the plurality of updated web presence schemas, corresponding to the first candidate,
obtaining a consistency score of at least a first entity attribute of the first updated web presence schema,
obtaining an average confidence score of the first updated web presence schema as a mean of confidence scores corresponding to the at least first entity attribute and a corresponding attribute value of the first updated web presence schema,
obtaining a relevance score based on a semantic similarity of the plurality of search queries and the at least first entity attribute and the corresponding attribute value of the first updated web presence schema, and
calculating a final score of the first updated web presence schema as a weighted combination of the completeness score, the consistency score, the average confidence score, and the relevance score, and
re-ordering the subset of candidates based on final scores corresponding to the plurality of updated web presence schemas.

13. A method, comprising:
executing, by an LLM, a plurality of search queries to obtain a plurality of verified search results comprising information regarding a plurality of candidates;
generating a plurality of web presence schemas corresponding to the plurality of candidates, based a set of highest confidence results selected from the plurality of verified search results;
initiating a plurality of web-scraping operations for the plurality of candidates, to obtain a plurality of corresponding web-scraping payloads; and
merging the plurality of corresponding web-scraping payloads with respective web presence schemas of the plurality of web presence schemas, corresponding to respective candidates of the plurality of candidates, by:
for a first candidate of the plurality of candidates,
obtaining a set of attribute values for a first entity attribute of a first web presence schema of the plurality of web presence schemas, corresponding to the candidate,
wherein a first attribute value of the set of attribute values is obtained from a first web-scraping payload of the plurality of corresponding web-scraping payloads corresponding to the first candidate, and the first web-scraping payload has a highest merge priority,
a second attribute value of the set of attribute values is obtained from the first web presence schema, and the first web presence schema has a second highest merge priority, less than the highest merge priority, and
a third attribute value of the set of attribute values is obtained from a highest confidence result of the set of highest confidence results, wherein the highest confidence result corresponds to the first candidate, and
wherein the highest confidence result has a confidence score that is higher than confidence scores of other highest confidence results corresponding to the first candidate, and
the highest confidence result has a third highest merge priority, less than the second highest merge priority,
obtaining a first confidence score of the first attribute value, a second confidence score of the second attribute value, and a third confidence score of the third attribute value,
responsive to the first attribute value being a non-null value, and the first confidence score being higher than an attribute confidence threshold of the first entity attribute, selecting the first attribute value as a final attribute value for the first entity attribute,
responsive to the first attribute value being a null value, and the second attribute value being a non-null value, and the second confidence score being higher than the attribute confidence threshold of the first entity attribute, selecting the second attribute value as the final attribute value for the first entity attribute, and
responsive to the second attribute value being a null value and the third attribute value being a non-null value, and the third confidence score being higher than the attribute confidence threshold of the first entity attribute, selecting the third attribute value as the final attribute value for the first entity attribute,
to obtain a corresponding updated plurality of web presence schemas,
re-ordering the plurality of candidates based on a recommendation function by:
for the first candidate of the plurality of candidates,
obtaining a completeness score of a first updated web presence schema of the corresponding updated plurality of web presence schemas, corresponding to the first candidate,
obtaining a consistency score of each entity attribute of a plurality of entity attributes of the first updated web presence schema,
obtaining an average confidence score of the first updated web presence schema as a mean of confidence scores corresponding to the plurality of entity attributes and corresponding attribute values of the first updated web presence schema,
obtaining a relevance score based on a semantic similarity of the plurality of search queries and the plurality of entity attributes and corresponding attribute values of the first updated web presence schema,
calculating a final score of the first updated web presence schema as a weighted combination of the completeness score, the consistency score, the average confidence score, and the relevance score, and
re-ordering the plurality of candidates based on final scores corresponding to the plurality of web presence schemas; and
presenting at least a top-ranked candidate from the plurality of candidates, and entity attributes and corresponding attribute values of a corresponding updated web presence schema from the corresponding updated plurality of web presence schemas in a user interface of a user application.

\* \* \* \* \*